United States Patent [19]

Slawson

[11] 4,150,427
[45] * Apr. 17, 1979

[54] MACHINE TOOL DATA SYSTEM AND METHOD

[75] Inventor: Kenneth L. Slawson, Depew, N.Y.

[73] Assignee: Houdaille Industries, Inc., Fort Lauderdale, Fla.

[*] Notice: The portion of the term of this patent subsequent to Jan. 11, 1989, has been disclaimed.

[21] Appl. No.: 421,103

[22] Filed: Dec. 3, 1973

Related U.S. Application Data

[60] Division of Ser. No. 150,637, Jun. 7, 1971, Pat. No. 3,816,723, which is a continuation-in-part of Ser. No. 744,392, Jul. 12, 1968, Pat. No. 3,634,662, which is a continuation-in-part of Ser. No. 652,968, Jul. 12, 1967, abandoned.

[51] Int. Cl.² ............... G06F 15/46; B23Q 21/00
[52] U.S. Cl. .................... 364/107; 318/570; 318/591
[58] Field of Search ........... 364/200, 107, 110, 111, 364/113, 474, 475; 318/594, 596, 570, 572, 573, 574, 568, 601, 569

[56] References Cited

U.S. PATENT DOCUMENTS

| | | | |
|---|---|---|---|
| 2,775,727 | 12/1956 | Kernahan et al. | 340/347 DA |
| 3,355,714 | 11/1967 | Culler | 364/200 |
| 3,465,298 | 9/1969 | La Duke et al. | 364/200 |
| 3,546,559 | 12/1970 | Kosem | 318/594 |
| 3,555,254 | 1/1971 | Gerber | 364/113 |
| 3,559,179 | 1/1971 | Rhoades | 364/200 |
| 3,562,715 | 2/1971 | Bishop et al. | 364/107 |

FOREIGN PATENT DOCUMENTS

| | | | |
|---|---|---|---|
| 786486 | 5/1968 | Canada. | |
| 1494849 | 8/1967 | France | 364/107 |
| 15635 | 9/1966 | Japan. | |

OTHER PUBLICATIONS

Digital Equipment Co., PDP-8, High Speed Digital Computer, 1965.
Digital Equipment Co., Digital Control Handbook C-110, 1968, pp. 201, 202.
Digital Equipment Co., Control Handbook-Tape Preparation, pp. 339-345.
Kosem: Hard Wired Numerical Controllers Yield to Efficient Minicomputers, Electronics, Apr. 12, 1973.
Pulse Technique Handbook, 1966, published by Nikkan (Japan), p. 919 cited.
Follingstad et al.: An Optical Encoder and Digit Register Proceedings IRE, Nov. 1952, pp. 1573-1583.

*Primary Examiner*—Felix D. Gruber
*Attorney, Agent, or Firm*—Hill, Gross, Simpson, Van Santen, Steadman, Chiara & Simpson

[57] ABSTRACT

A machine tool data system for receiving and storing abbreviated instructions representing blocks of machine tool control data and including pattern type instructions such as copy, mirror image and tool change each involving a series of such blocks, the computer responding to editing instructions such as insert or delete as to specified lines of stored instructions or computing the blocks represented by the stored instructions for transmission to an output device such as a tape punch, the computer generating the blocks of a pattern type series at the rate of utilization of said blocks by the output device. A machine tool may be connected on line and controlled by the computer simultaneously with the editing or tape preparation operations thereof, and the machine tool may be controlled manually from a data terminal on line with the computer when the terminal is not in use for tape preparation.

6 Claims, 2 Drawing Figures

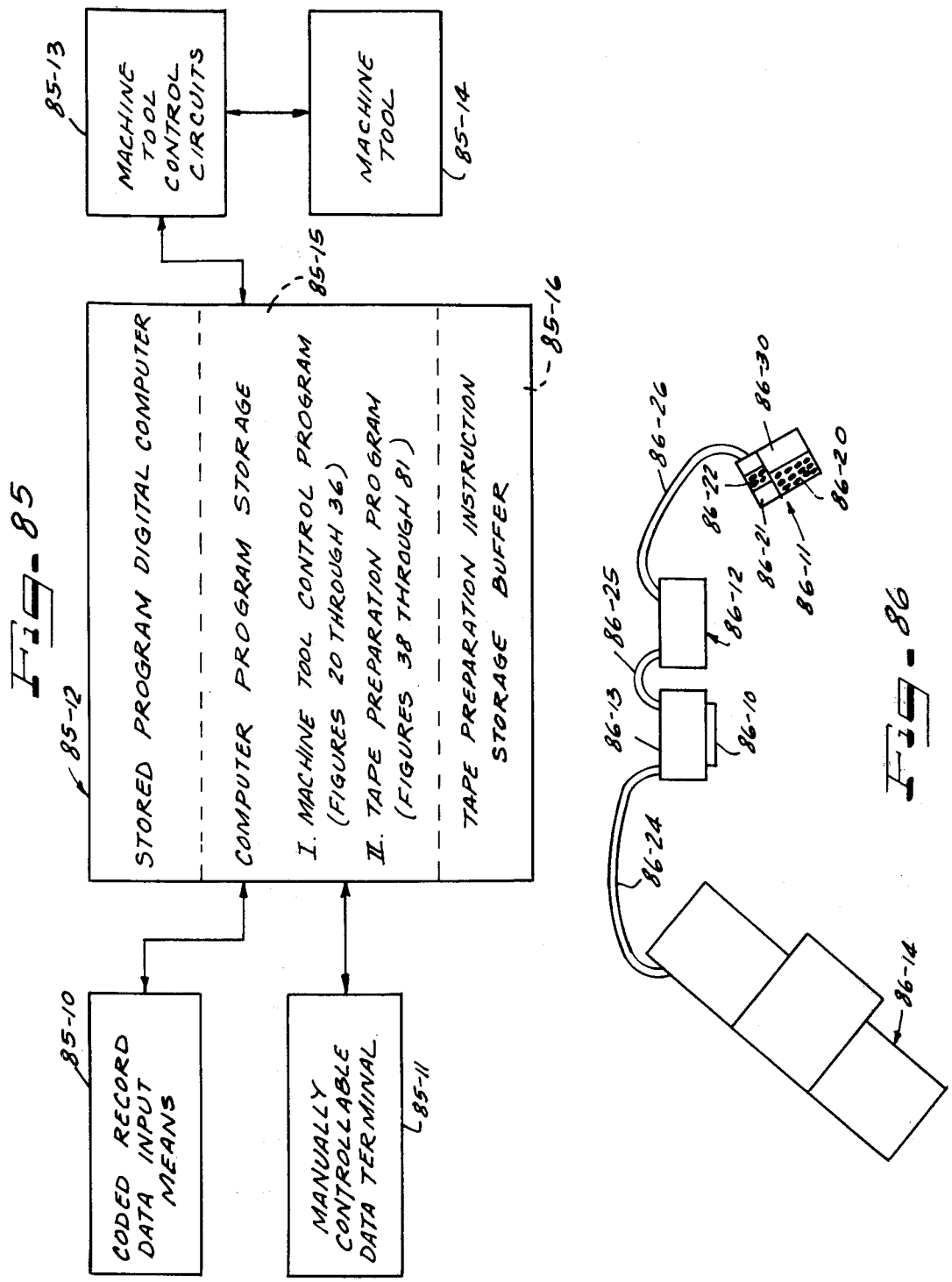

MACHINE TOOL DATA SYSTEM AND METHOD

CROSS-REFERENCES TO RELATED APPLICATIONS

The present application is a division of my copending application Ser. No. 150,637 filed June 7, 1971, used U.S. Pat. No. 3,816,723 issued June 11, 1974 and said application Ser. No. 150,637 in turn is a continuation in part of my application U.S. Ser. No. 744,392 filed July 12, 1968, now U.S. Pat. No. 3,634,662 issued Jan. 11, 1972, which in turn is a continuation in part of my prior application U.S. Ser. No. 652,968 filed July 12, 1967 (now abandoned).

Said application Ser. No. 150,637 also referred pursuant to 35 USC 120 to my applications U.S. Ser. No. 122,550 filed Mar. 9, 1971, now U.S. Pat. No. 3,689,821 issued Sept. 5, 1972, and U.S. Ser. No. 831,131 filed June 6, 1969, now U.S. Pat. No. 3,629,560 issued Dec. 21, 1971 and to my prior application Ser. No. 681,776 filed Nov. 9, 1967 (abandoned in favor of the continuation application Ser. No. 122,550).

SUMMARY OF THE INVENTION

A basic objective of the present invention is to provide a substantially more flexible machine tool control system capable of producing desired machine operations from basic data such as parts blueprints or the like with a substantially reduced overall expenditure of time and effort.

A further object of the invention is to provide such a machine tool control system and method which is competitive in cost with existing machine tool control systems.

Another basic objective is to provide a machine tool control system of substantially greater flexibility and throughput efficiency and yet which is of cost justifying its immediate introduction in job shops and other diversified parts production facilities.

A further object of the invention is to provide a machine tool control system and method capable of generating a coded record for a machine tool in response to both incremental and absolute input data in any desired order.

It is also an object of the present invention to provide a method and apparatus for compensating control systems for errors due to manufacturing tolerances wherein each individual control can be simply and economically adapted to adjust for a specific pattern of mechanical errors.

Still another and further object of the present invention is to provide a control system capable of automatically determining its own current operating characteristics at desired intervals and for thereafter taking into account any changes in such operating characteristics in executing future commands to the system.

A still further object of the invention resides in the provision of a numerical control system and method enabling the changing of input commands to correct for previous minor positioning errors and/or mechanical tolerance errors so as to provide improved overall accuracy.

Still another object of the invention is to provide a numerical control system and method with provision for substantially expediting the generation of new numerical control programs.

Yet another object of the invention is to provide a system and method for facilitating the generation of machine positioning numerical control programs.

Another and further object of the invention is to provide a numerical control system and method capable of simultaneously controlling the operation of one or more machine tools and/or of assisting in the generation of new numerical control positioning programs for future use in controlling machine tools.

Still another and further object is to provide such a system capable of controlling the operation of a plurality of machine tools and simultaneously providing a stored program digital computer facility available for simultaneous program generation.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure.

INCORPORATION BY REFERENCE

For a complete disclosure of my invention including the drawings FIGS. 1–84 and the description thereof, reference is made to U.S. Pat. No. 3,634,662. The Specification of said patent (Patent application Ser. No. 744,392 filed July 12, 1968) is hereby incorporated by reference and made a part hereof.

BRIEF DESCRIPTION OF THE DRAWINGS

FIGS. 1-84 are briefly described in U.S. Pat. No. 3,634,662 referenced above, at column 2, line 1 through column 3, line 40.

FIG. 85 is an overall block diagram of a machine tool system in accordance with the present invention; and FIG. 86 shows a physical layout of the components of a commercial system in accordance with FIG. 85 located adjacent one another on a factory floor.

DESCRIPTION OF THE ACCOMPANYING DRAWINGS

Referring to FIG. 85, there is indicated diagrammatically an overall system in accordance with the present invention including a coded record data input means 85-10, a manually controllable data terminal 85-11, a stored program digital computer 85-12, a machine tool control circuits component 85-13 and a machine tool 85-14. The computer component 85-12 has been indicated as including from a functional standpoint a computer memory including a section for computer program storage indicated at 85-15 and a section 85-16 serving as a storage buffer for tape preparation instructions.

FIG. 86 illustrates a corresponding layout of physical components for a commercial system in accordance with the embodiment of FIG. 85 and including a high speed tape reader 86-10, a typewriter console 86-11, a stored program digital computer 86-12, a machine tool control module 86-13 and a punch press 86-14. The console 86-11 may include a conventional keyboard 86-20, a conventional low speed tape reader and tape punch assembly 86-21 and a manual control panel 86-22 for control of the assembly 86-21 and its communication with the computer 86-12. The various components are shown as being interconnected by means of cables 86-24, 86-25 and 86-26.

The keyboard 86-20 constitutes an example of an input device operable to produce coded input signals or instructions representing blocks of machine tool control data including certain pattern type coded input signals or instructions each representing a series of blocks of machine tool control data. The tape punch of assembly 86-21 and the typewriter of console 86-11 are examples of output devices responsive to respective blocks of machine tool control data from the computer 86-12 to produce respective output operations, such as the punching of suitable machine tool control codes on a paper tape associated with the punch of assembly 86-21, or the printout of the blocks of machine tool control data by means of the typewriter. The stored program digital computer as represented at 85-12 in FIG. 85 or at 86-12 in FIG. 86 is operably connectable on line with the coded record data input means 85-10 or the high speed tape reader 86-10, for example, to receive successive blocks of machine tool control data and to compute under the control of the machine tool control program (indicated as program I in section 85-15 of component 85-12) corresponding blocks of machine tool displacement commands and to transmit the same to the machine tool control circuits 85-13 for execution by the machine tool 85-14. In a "TYPE" mode, machine tool control instructions may be manually transmitted from data terminal 85-11 to the computer for on line control of the machine tool 85-14 under direct supervision of an operator. The machine tool control program I under these circumstances is operable to respond to the machine tool control instructions and to generate the corresponding blocks of machine tool control data for transmission to the circuits component 85-13.

In a tape preparation mode, an operator may utilize terminal 85-11 to develop a new coded record for control of the machine tool 85-14, the operator utilizing an input device such as keyboard 86-20 connected on line with the computer 86-12 to produce coded input signals in the form of lines of successive instructions representing blocks of machine tool control data including certain pattern type coded input signals such as "copy", "mirror image" and "tool change" each involving a series of blocks of machine tool control data. The computer includes a tape preparation program identified as program II in section 85-15 of FIG. 85 for controlling the computer in the tape preparation mode. The computer also includes, for example as part of its core memory, the storage buffer 85-16 for the tape preparation instructions transmitted to the computer by the input device such as indicated at 85-11. The computer may operate on a time sharing basis in controlling the machine tool in response to a coded record at input means 85-10 and in assisting the preparation of a new coded record tape in on line association with data terminal 85-11. The computer under the control of the tape preparation program is responsive to editing instructions from data terminal 85-11 such as "insert" or "delete" as to specified lines of instructions in the storage buffer 85-16. As part of the computer operation in tape preparation mode, the computer is connectable on line with the tape punch or typewriter of console 86-11, for example, and is operable under the control of the tape preparation program to retrieve the successive instructions in the storage buffer 85-16 and to compute the corresponding blocks of machine tool control data for supply character by character to the tape punch, for example.

In retrieving a pattern type instruction from the storage buffer 85-16, the computer calculates a first block of machine tool control data and transmits the same to the tape punch, for example, acting as an output device, the computer timing the computation of the succeeding blocks of the series of blocks represented by the pattern type instruction in accordance with the rate of response of the output device such as the tape punch so that it is unnecessary for the computer internal memory to store any substantial number of the blocks of the series of blocks represented by the pattern type instruction. As an example, in section 1.10 (EXAMPLE OF PIECE PART PROGRAMMING) there is illustrated a line of instruction identified as reference block number 0011, which results in the generation by the computer of blocks of machine tool control data identified as block numbers 0011 through 0019. By storing only the instruction line, and by calculating the blocks of machine tool control data concurrently with their transmission to the output device, very substantial reductions in the capacity of computer memory are achieved.

The components of FIGS. 85 and 86 may operate in any of the manners described in the applications referred to as related applications herein, and all such features of structure and operation are disclosed with reference to the components of FIGS. 85 and 86.

FIGS. 38-81

FIGS. 38-81 are flow diagrams illustrating the tape preparation program for a commercial system in accordance with the systems of FIGS. 85 and 86, the detailed tape preparation program being set forth under the heading "Contents of Computer Memory" beginning at column 42 of said U.S. Pat. No. 3,634,662.

In the following summaries references to section numbers designate sections of the "Excerpts From Operation Manual" found in the disclosure of the aforesaid U.S. Pat. No. 3,634,662.

SUMMARY OF FEATURES OF THE TAPE PREPARATION PROGRAM

In general, as will be apparent from section 1.10 the computer 85-12 operates under the control of its stored program II stored in computer memory 85-15 to respond to certain coded input signals received from an input device such as the manually operated input device 85-11. For example, where the input device includes a keyboard 86-20, the keyboard can be manually actuated to type the letter "S" standing for the "Start" command explained in section 1.8-1. The computer under the control of its stored program responds to the "start" or "initial" coded input signal so generated to print out "X Limit=". The operator then types on the keyboard the X dimension of the workpiece, for example "18." for the workpiece, of FIG. 19 having a dimension of 18 inches parallel to the X axis. The computer under the control of the stored program upon receipt of the X axis limit causes the typewriter 86-30 to print out "Y Limit=", whereupon the operator types in the Y dimension of the workpiece, for example "12." for the workpiece of FIG. 19 having a dimension of 12 inches parallel to the Y axis. As explained under section 1.8, "4. Diagnostics", the computer program provides for an "Overflow" print out to advise the operator that the last block contained an increment which cause the cumulative coordinates with respect to an initial reference point (such as REF. PT. "A" of FIG. 19) to be off the workpiece as defined by the aforesaid X Limit and Y Limit previously given by the operator.

Further, as explained under "2. Move Entries", a coded input signal of a pattern type may call for the generation of machine tool control data by the computer for carrying out an automatic tool change move. The computer in response to the typing of a symbol "T" signifying the automatic tool change, may utilize the Y limit in conjunction with an accumulated absolute displacement value representing the present work table position to compute an incremental displacement value required to shift the workpiece clear of the tool operating position. Thus, referring to section 1.10, the "T" coded input signal is shown as being generated in reference block number 0020. Referring to the workpiece of FIG. 19, it will be observed that the machine tool operating position is in alignment with REF. PT. "B" for block "19" corresponding to block number 0019. Since the accumulated Y axis displacement value is minus 6.000 for REF. PT. B in FIG. 19, and since tool change is to take place 2.5 inches off the workpiece, the computer will determine that an incremental move of 12.000 minus 6.000 plus 2.500 is required along the Y axis in order to move the workpiece to the required offset position. Thus block number 0020 requires an incremental X axis move of 0.000 and an incremental Y axis move of minus 8.500. The computer program will also generate suitable auxiliary function commands such as "S" meaning "Stop", "I" meaning "Inhibit Punch" and "D" meaning "Die Change". See the commands for block 0020.

Referring to FIG. 19, it will be observed that the larger diameter hole to be punched for block 21 is located at absolute displacement values relative to REF. PT. "A" of X equals 14. and Y equals minus 8. As seen in section 1.10 after the tool change operation of block 0020, the operator may enter the coordinates of the next position, whereupon the computer will determine the necessary incremental moves required to move the work table from the offset position indicated at "20" in FIG. 19. Thus, referring to the print out of block 0021 it will be observed that the computer has determined that incremental moves of X equals plus 5.000 and Y equals plus 6.500 will move the work table so that the workpiece of FIG. 19 has the large diameter hole of block number 21 disposed at the tool operating position. As indicated in one of the Notes of section 1.8 it is not necessary to program a "P" after a block that has an inhibit punch ("I"). Thus while the symbol "I" was automatically inserted by the computer for block 0020, the computer will automatically insert the punch command "P" for block 0021. Thus, in executing block number 0021, the computer would cause the machine tool control to move the work table five inches to the left and 6.5 inches in an outward direction so that location 21 of FIG. 19 would then be at the machine tool operating position, and whereupon the computer would cause a punch operation to be executed.

The response of the computer under the control of the stored program to other pattern type coded input signals is explained in section 1.8, 1.10 and 2.4 of the present specification. These pattern type coded input signals include the following: C directing the computer to generate a series of new blocks corresponding to a series of previous blocks (see reference block number 0003); X meaning copy a specified series of previous blocks with the sign of the X axis displacement increments reversed; Y meaning copy a specified series of previous blocks with the sign of the Y axis increments reversed; and M meaning copy a specified series of blocks with both the X and Y increments reversed in sign. The C, X, Y and M commands are represented by blocks 0003 and 0011–0019. Thus, it will be observed that these pattern type coded input signals generate moves which are repetitions of or mirror images of the moves specified by a previous series of blocks. For example referring to FIG. 19, it will be observed that the movements to holes generated by blocks number 11, 12, 17 and 18 form a mirror image in relation to the holes of block numbers 8, 9, 14 and 15.

Referring to block number 0023, it will be noted that the blocks of machine tool control data generated by the input device can be placed on punched tape in response to the command "P" which is explained in section 1.8, paragraph No. 9. Thus, the computer under the control of the stored program will punch a tape in EIA code in accordance with the blocks such as listed in section 1.10.

As explained in section 2.5, the tape reader 86-10 may read successive blocks of information which are presented in the EIA format. As explained in section 2.0, in step mode of operation, the computer 86-12 is operable to read one block of information at a time while inhibiting the machine function so that this mode of operation can be used by the machine tool operator to verify the positioning of machine tool 86-14 without producing a piece part. As explained in section 2.4, under "Part and Program Verification" the machine tool operator may stop the piece part production at any point and examine the schematic diagram in comparison to the value displayed in the absolute value display counters such as 450, FIG. 4. Further, the standard machine tool program will allow the machine to punch any given part at its maximum speed, while at the same time the console typewriter 86-30 attached to the computer control will be printing out as fast as it can the positioning error for X and Y for each move of the piece part. Thus, when the piece part is finished and the typewriter has stopped printing, the machine operator will have a finished part and written record of the positioning accuracy of the machine tool.

Other important features of the tape preparation program are summarized in section 2.4 of the specification.

SUMMARY OF TAPE PREPARATION OPERATION

As explained in section 1.2 with respect to the "Console Typewriter Module" the computer console 86-11 includes not only the console typewriter 86-30 but also includes a tape punch or coded record producing device (part of 86-21) and a tape reader or coded record reading device (also part of 86-21). These components are distinct from the high speed tape reader 86-10 which has an interface shown in some detail in FIG. 10. The source of instructions 85-10 may be thought of as constituting the high speed tape reader 86-10 and interface and/or the coded record device of the Console Typewriter Module 86-11, since either coded record device may be utilized for transmitting successive blocks of machine tool control data to the computer accumulator register.

To read coded records into the computer memory, certain coded input signals are generated by the console typewriter 86-30 which serves as a manually controllable input device. Where the coded record is in EIA format the characters RE are generated by component 86-11 as explained in paragraph 11 of section 1.8, while if the coded record is in ASCII format, the characters RA are generated as described in paragraph number 12. As described in paragraph 12, as the blocks are transmitted to the computer, the computer under the control of its stored program will renumber the blocks as they are stored in the computer memory 85-16, starting with one.

It will be observed from section 1.8, that numerous commands can be transmitted to the computer from the console 86-11 by means of a single character-generating manual actuation of the input keyboard 86-20, exclusive of actuations of the keyboard to identify a series of blocks, or to identify a plurality of repetitions with respect to a series of blocks. Thus the characters S, E, I, L, D, C, and so on, are all transmitted to the computer by means of a single character-generating manual actuation of the console keyboard.

As explained, for example, in section 1.8 with the exception of the coded insert signal represented by the character I, the computer under the control of the stored program will cause the console typewriter 86-30 to print out a block number before the entry of each successive data block. Thus, as indicated at the right hand column of the tabulation in section 1.10, after the "Start" operation, the computer will cause the console typewriter to print out "0001", signifying that the computer is now ready to receive the displacement type coded input signals such as "1.5" representing the incremental move with respect to the X axis. The console typewriter 86-30 thus includes a display device under the control of the computer for displaying the successive block numbers to which the computer will assign the next set of coded input signals from the console keyboard. As also indicated in section 1.10, the console typewriter 86-30 acting as a display device will print out the successive block numbers together with the associated machine tool function commands (such as P for punch) and incremental and absolute displacement values for the respective axes.

A more detailed summary of operation is found in section 2.

The copy command is an example of a pattern type coded input signal which may include a block identifying signal (the code characters N, M specifying block numbers N through M, inclusive) and which may include a repeat signal (the character X specifying a pattern type operation on the series of blocks X times). Other examples of pattern type coded input signals are the tool change signal (represented by the character T in data mode) and the mirror image coded input signals (X, Y and M). See also the software refinements given in the second paragraph under section 2.6.

The console typewriter module 86-11 provides both a manually operable keyboard 86-20 and a coded record device 86-21 for punching new tapes and for reading previously prepared tapes. The console typewriter is also indicated at 3703 in FIG. 37 and includes a manually operable line type character generator (for example the keyboard 86-20) for generating successive lines of coded input signals, the end of each line being signalled by actuation of the carriage return. The console typewriter module 3703 further includes a display device (provided by the print out capacity of the typewriter) which includes a display region where the successive characters generated in a single line operation of the character generator are displayed as a horizontal line on the display region.

See the example of actual block print out in section 1.10 of the disclosure of U.S. Pat. No. 3,634,662. It will be noted from reference block 0022 of section 1.10 that the typewriter 86-30 is operable to generate a displacement type coded input signal including a series of displacement values (e.g. minus 14. plus 9. minus 1.25 plus 5.) whose algebraic sum (equals minus 1.250) represents a coordinate value specifying a movement of the work table relative to one of the axes (e.g. the X axis as represented in FIG. 19). (Note the X coordinate value for the hole number 22 in FIG. 19.) It will be noted that a pattern type coded input signal (such as 4C2 at block 0003, application page 104) can be generated in a single line operation of the typewriter module 3703.

SUMMARY OF THE CLAIMED SUBJECT MATTER

The claimed subject matter relates to closed loop movement control circuits as shown in FIG. 6 and to digital to analog converter means including counter circuits such as XL11-XL5, FIG. 1A and XL0, XU11-XU0, FIG. 1B. In the exemplary embodiment, the counter circuit receives feedback pulses generated as a function of movement of a part of a machine tool via the line X-Clock 119 shown at the left in FIG. 1A and shown at the right at 199 in FIG. 4. The synchronizer circuitry of FIG. 4 is represented by block 117 at the lower right of FIG. 1B, and it will be noted from FIGS. 1B and 4 that the synchronizer 117 is interposed between the feedback transducer system including X-axis transducer 112, FIG. 1B and FIG. 4, and the X clock line 199 shown as the lower output at the left of synchronizer 117 in FIG. 1B. The Hold X component 115 shown at the right in FIG. 1B as controlling synchronizer 117 is also shown at the upper right in FIG. 4.

As explained in the section entitled "Operation of FIG. 6" (at column 17 of U.S. Pat. No. 3,634,662), as soon as both axes remain in the vicinity of the required end point for the required time, the detector components such as X-axis null detector 110, FIG. 1B, signal the computer, for example via channel 627, machine positioning interface component 628 and channel 629. Other operations of the computer 603 may thus be interrupted by means of a program interrupt signal from interface 628, at which time the computer will energize the axis Hold component such as 115, FIG. 1B, and read the contents of the associated counter chain. The communication with the computer system via an interrupt line or by the transmission of a single input information bit such as via the move-complete line 1122, shown in FIG. 11 at the right and in FIG. 37 at the upper left is termed an information return transmission.

The return coded data transmission circuit as claimed herein may extend from the digital to analog converter means to the computer system and involves the transmission of coded data by means which in the illustrated embodiment includes the connections shown in FIGS. 1A and 1B, for example, where the series of digital outputs from the stages of the digital to analog converter means are conducted by means of conductors 185-191 in FIG. 1A and 192-195, FIG. 1B to the gates 104 and 108 which also appear at the left in FIG. 3. All of these return coded data transmission lines of the return data transmission circuitry may connect with a multiconductor computer bus such as bus 197 indicated at the right in FIG. 3 as returning to the computer accumulator. Thus, the two-way coded data transmission circuitry conecting the closed loop movement control circuit such as shown in FIGS. 1A and 1B on line with the stored program digital computer includes the computer output bus 130 shown in FIG. 2 and the computer return bus 197 shown in FIG. 3.

As explained in section 2.3 at cols. 37 and 38, the computer system may supervise the operation of the machine tool control system by supplying successive displacement commands to the closed loop movement control circuit shown in FIGS. 1A and 1B. Further the computer system is operably responsive to digital count values from the digital to analog converter means of FIGS. 1A and 1B, for example to use small positioning errors from one move to calculate the corresponding digital control data for the next move and as explained at col. 40, lines 2-9, the computer system is also operable to cause the printing out of such positioning errors so as to provide coded data from the movement control circuit as to the operation of the control system.

The operation of the circuitry of FIG. 4 with respect to the two-way coded data transmission circuitry will be understood from the section entitled "Operation of FIGS. 1A and 1", (for example at col. 127 line 59 to col. 137 line 33). Thus, actuation of the Hold X component 115 shown at the right in FIG. 1B and at the upper right in FIG. 4 causes synchronizer 117 to interrupt the supply of X clock pluses for a sufficient interval to insure that the counting stages of the digital to analog converter means may be inspected by the computer. The "Hold" interval is related to the duration of the readout operation by the computer but is sufficiently short, so that any feedback pulse from transducer 112 that might occur during the readout operation would only be blocked for a portion of its duration. Thus, transitions of the count value in the closed loop movement control circuit of FIGS. 1A and 1B are prevented during the readout operation.

I claim as my invention:

1. A computerized machine tool control system comprising a closed loop movement control circuit for responding to digital control signals to control motion of a machine tool, a stored program digital computer system operable to supply digital control signals for said closed loop movement control circuit and having an on line connection with said closed loop movement control circuit for the transmission of the digital control signals directly thereto and operable to accept and act upon coded data from the movement control circuit, and a return coded data transmission circuit connecting said closed loop movement control circuit on line with said stored program digital computer system for the transmission of coded data as to the operation of said motion control circuit directly to said digital computer system.

2. In a numerical control system, a machine tool control system having respective digital to analog converter means for controlling the rate of machine tool movement relative to respective machine tool axes, and operable for registering respective digital count values relative to the respective machine tool axes, the respective digital to analog converter means having respective digital outputs for transmitting the respective digital count values so as to provide information as to the functioning of the control system, a stored program digital computer system connected on line with said machine tool control system for supervising the operation of said control system and operable to receive digital count values from said digital to analog converter means, and a return coded data transmission circuit connecting said digital outputs of said digital to analog converter means with said digital computer system and providing for an online transmission of the respective digital count values from the respective digital to analog converter means to said digital computer system.

3. In a machine tool system having only a single machine tool and including respective feedback transducer means responsive to movement of parts of a machine tool relative to respective machine tool axes to generate feedback signals in accordance therewith, (a) coded record means operable in an input mode for supplying successive blocks of machine tool control instructions of a previously established sequence and operable in an output mode for producing a sequence of blocks of machine tool control instructions on a coded record, (b) stored program digital computer means including random access computer memory means for storing at respective identified locations of a series of memory locations thereof respective blocks of machine tool control instructions, and operable in a first mode to store successive blocks of machine tool control instructions of a previously established sequence at successive identified locations of said series of memory locations of said computer memory means to produce a stored sequence of such blocks, and operable in a second mode to respond to respective different manually generated coded editing instructions as specifying respective different editing operations on identified respective ones of said locations of said series of memory locations of said computer memory means and to effect such editing operations on such identified locations of said series of memory locations in said computer memory means, operable in a third mode for responding to a coded record output signal to supply as an output a stored sequence of blocks of machine tool instructions stored in said series of memory locations of said computer memory means, and operable in a fourth mode for generating digital command signals in accordance with successive blocks of machine tool control instructions of a previously established sequence, (c) manually controlled input means connected with said digital computer means and selectively manually actuatable to supply to said digital computer means respective different manually generated coded editing instructions as specifying respective different editing operations on selected ones of the respective locations of said series of memory locations and selectively manually actuatable to supply to said digital computer means a coded record output signal, (d) machine tool control and interface means for supplying coded data signals as output therefrom in response to a readout selection signal, and including plural axis closed loop machine tool control means operatively coupled to the respective parts of the machine tool and to said feedback transducer means and reponsive to digital command signals and to said feedback signals to control movements of the parts of the machine tool relative to the respective machine tool axes, and operable to supply coded data signals as to the status thereof, and (e) on-line two-way interconnection means providing two-way on-line interconnection between said coded record means, said stored program digital computer means and said machine tool control and interface means, and providing for the on-line transmission of successive blocks of machine tool control instructions from said coded record means to said digital computer means, for the on-line transmission of successive blocks of machine tool control instructions from said digital computer means to said coded record means, for the on-line transmission of digital command signals and readout selection signals from said digital computer means to said machine tool control and interface means, and for the on-line transmission of coded data signals in accordance with the status of the machine tool control means from said machine tool control and interface means to said digital computer means.

4. In a machine tool system having only a single machine tool and including respective feedback transducer means responsive to movement of parts of the machine tool relative to respective machine tool axes to generate feedback signals in accordance therewith, (a) coded record means operable in an input mode for supplying successive blocks of machine tool control instructions of a previously established sequence, (b) stored program digital computer means operable for generating a readout selection signal and including random access computer memory means having a series of memory locations thereof for storing blocks of machine tool control instructions, and operable in a first mode to store successive blocks of machine tool control instructions of a previously established sequence at said series of memory locations of said computer memory means to produce a stored sequence of such blocks, and operable in a second mode to respond to manually generated coded editing instructions as specifying editing operations on respective locations of said series of memory locations of said computer memory means and to effect such editing operations on such locations of said series of memory locations, operable in a third mode to supply as an output a stored sequence of blocks of machine tool instructions stored in said series of memory locations of said computer memory means, and operable in a fourth mode for generating digital command signals in accordance with successive blocks of machine tool control instructions of a previously established sequence, (c) manually controlled input means connectable on-line with said digital computer means and selectively manually actuatable to supply to said digital computer means manually generated coded editing instructions as specifying editing operations on respective locations of said series of memory locations, (d) machine tool control and interface means for supplying coded data signals as output therefrom in response to a readout selection signal, and including plural axis closed loop machine tool control means operatively coupled to the respective parts of the machine tool and to said feedback transducer means and responsive to digital command signals and to said feedback signals to control movements of the parts of the machine tool relative to the respective machine tool axes, and (e) on-line interconnection means providing on-line interconnection between said coded record means, said stored program digital computer means and said machine tool control and interface means, and providing for the on-line transmission of successive blocks of machine tool control instructions from said coded record means to said digital computer means, for the on-line transmission of digital command signals and the readout selection signal from said digital computer means to said machine tool control and interface means, and for the on-line transmission of coded data signals from said machine tool control and inerface means to said digital computer means.

5. In a machine tool system having a machine tool and including respective feedback transducer means responsive to movement of parts of the machine tool relative to respective machine tool axes to generate feedback signals in accordance therewith, (a) coded record means operable in an input mode for supplying successive blocks of machine tool control instructions of a previously established sequence and operable in an output mode for producing a sequence of blocks of machine tool control instruction on a coded record, (b) stored program digital computer means including random access computer memory means having a series of memory locations thereof for storing a sequence of blocks of machine tool control instructions, and operable in a first mode to store successive blocks of machine tool control instructions of a previously established sequence at said series of memory locations of said computer memory means to produce a stored sequence of such blocks, and operable in a second mode to respond to manually generated coded editing instructions as specifiying respective different editing operations on respective locations of said series of memory locations of said computer memory means and to effect such editing operations on such locations of said series of memory locations, operable in a third mode to supply as an output a stored sequence of blocks of machine tool control instructions stored in said series of memory locations of said computer memory means, and operable in a fourth mode for generating digital command signals in accordance with successive blocks of machine tool control instructions of a previously established sequence, (c) manually controlled input means connected on-line with said digital computer means and selectively manually actuatable to supply to said digital computer means manually generated coded editing instructions as specifying editing operations on respective locations of said series of memory locations, (d) machine tool control and interface means including plural axis closed loop machine tool control means operatively coupled to the respective parts of the machine tool and to said feedback transducer means and responsive to digital command signals and to said feedback signals to control movements of the parts of the machine tool relative to the respective machine tool axes, and (e) on-line interconnection means providing on-line interconnection between said coded record means, said stored program digital computer means and said machine tool control and interface means, and providing for the on-line transmission of successive blocks of machine tool control instructions from said coded record means to said digital computer means, for the on-line transmission of successive blocks of machine tool control instructions from said digital computer means to said coded record means, and including computer bus means for the on-line transmission of digital commands signals from said digital computer means to said machine tool control and interface means.

6. In a machine tool system having a machine tool and including respective feedback transducer means responsive to movement of parts of the machine tool relative to respective machine tool axes to generate feedback signals in accordance therewith, (a) coded record means operable in an input mode for supplying successive blocks of machine tool control instructions of a previously established sequence, (b) stored program digital computer means operable for generating readout selection signals and including random access computer memory means having a series of memory locations thereof for storing a sequence blocks of machine tool control instructions, and operable in a first mode to store successive blocks of machine tool control instructions of a previously established sequence at said series of memory locations of said computer memory means to produce a stored sequence of such blocks, and operable in a second mode to respond to manually generated coded editing instructions as specifying editing operations on respective locations of said series of memory locations of said computer memory means and to effect such editing operations on such locations of said series of memory locations, operable in a third mode to supply as an output a stored sequence of blocks of machine tool instructions stored in said series of memory locations of said computer memory means, and operable in a fourth mode for generating digital command signals in accordance with successive blocks of machine tool control instructions of a previously established sequence, (c) manually controlled input means connected on-line with said digital computer means and selectively manually actuatable to supply to said digital computer means manually generated coded editing instructions as specifying editing operations on respective locations of said series of memory locations, (d) machine tool control and interface means for supplying coded data signals as output therefrom in response to readout selection signals, and including plural axis closed loop machine tool control means operatively coupled to the respective parts of the machine tool and to said feedback transducer means and responsive to digital command signals and to said feedback signals to control movements of the parts of the machine tool relative to the respective machine tool axes, and operable to supply coded data signals as to the status thereof, and (e) on-line interconection means providing on-line interconnection between said coded record means, said stored program digital computer means and said machine tool control and interface means, and providing for the on-line transmission of successive blocks of machine tool control instructions from said coded record means to said digital computer means, and including computer bus means extending between said digital computer means and said machine tool control and interface means for the on-line transmission of digital command signals and readout selection signals from said digital computer means to said machine tool control and interface means and for the on-line transmission of coded data signals in accordance with the status of the machine tool control means from said machine tool control and interface means to said digital computer means.

* * * * *